US010366265B2

(12) United States Patent
Agarwal et al.

(10) Patent No.: US 10,366,265 B2
(45) Date of Patent: Jul. 30, 2019

(54) DYNAMIC AND SOFT QR BASED MONITORING OF PROCESS EQUIPMENT HEALTH/STATUS IN A CONNECTED PLANT

(71) Applicant: Honeywell International Inc., Morris Plains, NJ (US)

(72) Inventors: Shubham Agarwal, Telangana (IN); Sharath Babu Malve, Karnataka (IN); Amol Gandhi, Karnataka (IN); Anant Vitthal Vidwans, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 1 day.

(21) Appl. No.: 15/668,978

(22) Filed: Aug. 4, 2017

(65) Prior Publication Data
US 2019/0042819 A1  Feb. 7, 2019

(51) Int. Cl.
*G06K 7/14* (2006.01)
*G05B 19/418* (2006.01)

(52) U.S. Cl.
CPC ..... *G06K 7/1417* (2013.01); *G05B 19/41835* (2013.01); *G05B 2219/32404* (2013.01)

(58) Field of Classification Search
CPC .. G06K 7/10; G06K 9/36; G06K 9/80; G06K 19/00; G06K 9/18; G06F 17/00
USPC ............ 235/462.1, 462.09, 375, 462.01, 487
See application file for complete search history.

(56) References Cited

U.S. PATENT DOCUMENTS

| 7,079,033 | B2 | 7/2006 | Itou |
| 8,993,966 | B2 | 3/2015 | Cole |
| 9,038,897 | B2 | 5/2015 | Jayaprakash et al. |
| 9,063,541 | B2 | 6/2015 | Kane et al. |
| 9,386,738 | B2 | 7/2016 | Peterson et al. |
| 9,581,993 | B2 | 2/2017 | McAdam et al. |
| 9,595,144 | B2 | 3/2017 | Kolavennu et al. |
| 2007/0199047 | A1* | 8/2007 | Gibart ..................... G06F 21/32 726/2 |
| 2013/0069781 | A1* | 3/2013 | Terwilliger ............ G06Q 10/08 340/539.13 |
| 2013/0277422 | A1* | 10/2013 | Weinberg ............. G06Q 30/016 235/375 |
| 2013/0292461 | A1* | 11/2013 | Plutt .................. G11B 15/6835 235/375 |
| 2014/0240087 | A1 | 8/2014 | Liu et al. |
| 2014/0312112 | A1* | 10/2014 | Floyd ................ G06F 17/30002 235/375 |
| 2014/0314320 | A1 | 10/2014 | Bae et al. |

(Continued)

OTHER PUBLICATIONS

Augmented reality—Wikipedia, printed May 17, 2017, 27 pages.
Azuma, R. et al., Recent Advances in Augmented Reality, Computers & Graphics, Nov. 2001, 15 pages.
Lee, K., Augmented Reality in Education and Training, TechTrends, Mar./Apr. 2012, 56(2):13-21.

(Continued)

*Primary Examiner* — Edwyn Labaze (57) ABSTRACT

Methods and systems for monitoring process equipment such as field devices. A QR code can be associated with a field device, wherein the QR code contains data that identifies the field device, and also includes process data regarding the field device, the location of the field device, and maintenance information, installation information and fault information associated with the field device. The QR code can then be scanned and decoded in order to retrieve the data for use in in monitoring and maintaining field devices in the context of a connected plant.

20 Claims, 6 Drawing Sheets

(56) References Cited

U.S. PATENT DOCUMENTS

| | | | |
|---|---|---|---|
| 2015/0081922 A1 | 3/2015 | Brett | |
| 2015/0161496 A1* | 6/2015 | Rodriguez | G06K 19/06037 235/494 |
| 2015/0261962 A1 | 9/2015 | Mevec et al. | |
| 2015/0261970 A1 | 9/2015 | Mevec et al. | |
| 2015/0264056 A1 | 9/2015 | Mevec et al. | |
| 2015/0264057 A1 | 9/2015 | Mevec et al. | |
| 2015/0289309 A1 | 10/2015 | Kolavennu et al. | |
| 2015/0379552 A1 | 12/2015 | Kent et al. | |
| 2016/0094345 A1 | 3/2016 | Chen et al. | |
| 2016/0321489 A1 | 11/2016 | Scipioni | |
| 2017/0019721 A1 | 1/2017 | Digiulian | |
| 2017/0061185 A1 | 3/2017 | Wang et al. | |
| 2017/0364106 A1* | 12/2017 | Smith | G06Q 10/087 |
| 2018/0024534 A1* | 1/2018 | Russell, III | G05B 13/0205 700/19 |
| 2018/0176784 A1* | 6/2018 | Carter | G06F 17/30292 |

OTHER PUBLICATIONS

Irons-McLean, R. et al., Connected Refineries and Processing Plant, Cisco Reference Document (CRD), Jan. 2016, 112 pages.

Sutherland, I. E., A Head-Mounted Three-Dimensional Display, AFIPS '68 (Fall, part I) Proceedings of the Dec. 9-11, 1967, fall joint computer conference, part I, San Francisco, CA, pp. 757-764.

Braud, T. et al., Future Networking Challenges: The Case of Mobile Augmented Reality, 2017 IEEE 37th International Conference on Distributed Computing Systems (ICDCS), Jun. 5-8, Atlanta, GA, 12 pages.

Gas book, Honeywell, 2006, Honeywell Analytics, 84 pages.

Intuition Operations Monitoring: Latest Software for Improving Plant Performance, Reliability and Safety, Honeywell, 2013, Honeywell Process Solutions, 9 pages.

State, A. et al., Superior Augmented Reality Registration by Integrating Landmark Tracking and Magnetic Tracking, Proceedings of the 23rd Annual Conference on Computer Graphics and Interactive Techniques, New York, NY (1996) pp. 429-438.

* cited by examiner

FIG. 1

Dynamic QR

FIG. 2

QR date over wireless
link for non-display
devices

DYNAMIC AND SOFT QR BASED MONITORING OF PROCESS EQUIPMENT HEALTH/STATUS IN A CONNECTED PLANT

TECHNICAL FIELD

Embodiments are related to industrial process control and automation systems. More specifically, embodiments are related to the monitoring of industrial process control and automation systems. Embodiments are additionally related to methods and systems for communicating with field instruments in an industrial control system to capture data on field devices about an industrial process and system in, for example, a connected plant. Embodiments further relate to multi-dimensional codes, such as, for example, QR (Quick Response) codes.

BACKGROUND

A connected plant is a networked "connected" refinery or processing plant that implements an industrial process control and/or automation system having various wireless and wired control rooms, security communication networks, and in-plant monitoring devices and systems. Examples of a connected plant include petrochemical processing facilities or other refining and processing plant environments.

In the process control industry, the use of smart pressure, temperature, and level field instruments has become commonplace, because they can be installed almost anywhere at a facility due to their compact size. For field installations utilizing wired devices, the wired device may be used on a continuous process that operates on a long-term basis. Because of the continuous nature of the process, the wired device should not be removed from service for even a brief period, as doing so can disrupt the process and cause business losses.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved monitoring and maintenance of process control and automation systems.

It is another aspect of the disclosed embodiments to provide for improved method and systems for communicating with field instruments in an industrial control system to capture data on field devices about an industrial process in, for example, connected plant.

It is yet another aspect of the disclosed embodiments to the use of QR codes for monitoring and maintaining process control equipment such as field devices including valves, furnaces, boilers, and so on in a connected plant.

The aforementioned aspects and other objectives and advantages can now be achieved as described herein. Methods and systems are disclosed for monitoring process equipment such as field devices. A QR code can be associated with a field device, wherein the QR code contains data that identifies the field device, and also includes process data regarding the field device, the location of the field device, and maintenance information, installation information and fault information associated with the field device. The QR code can then be scanned and decoded in order to retrieve the data for use in monitoring and maintaining field devices in the context of a connected plant.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alterative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Figure 1:
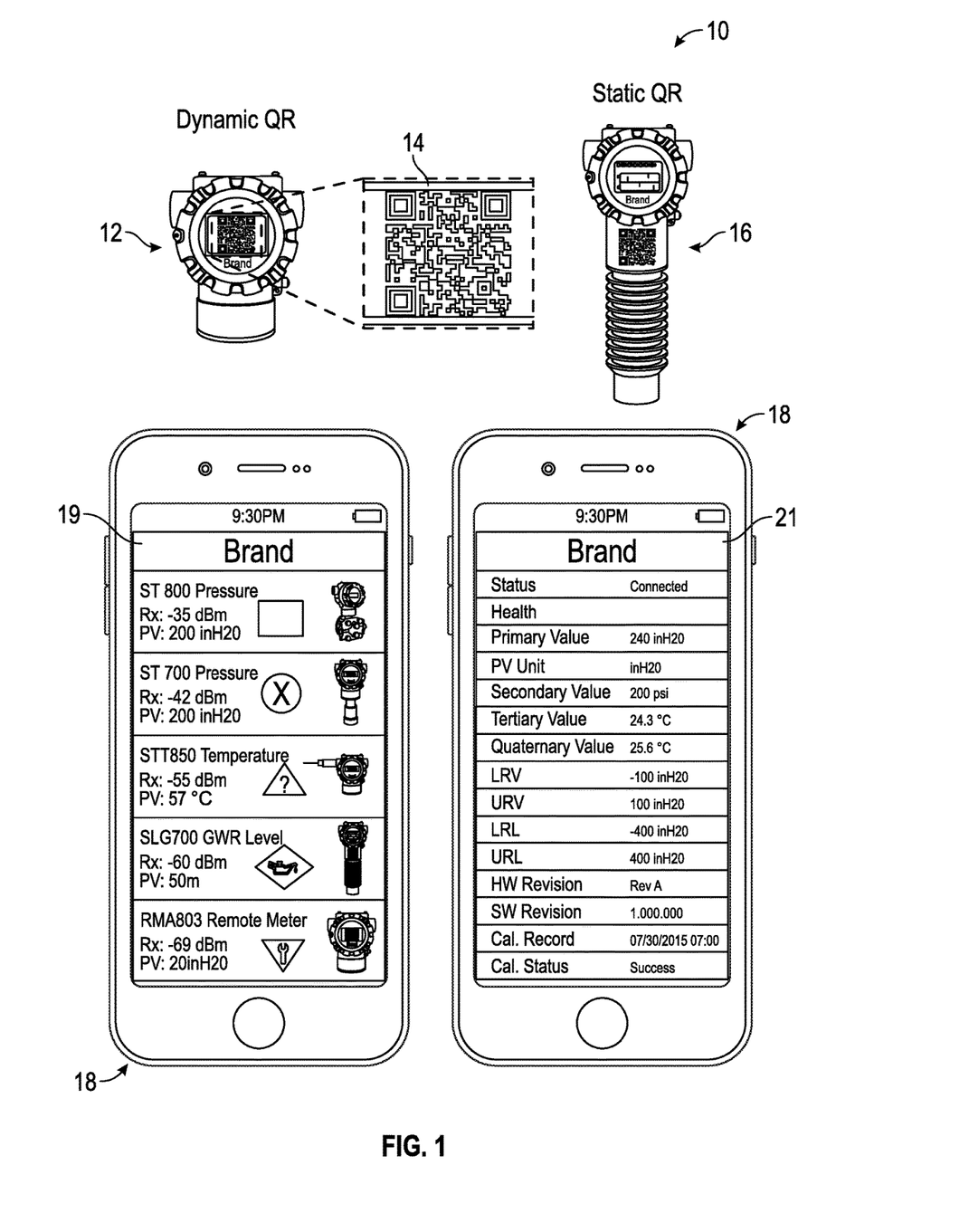
FIG. 1 illustrates a schematic diagram of a QR code system for use in monitoring processing equipment in a connected environment, in accordance with an example embodiment.

FIG. 1 illustrates a schematic diagram of a QR (Quick Response) code system for use in monitoring processing equipment in a connected environment, in accordance with an example embodiment. Two types of QR code arrangements can be implemented, in accordance with varying embodiments. As shown in FIG. 1, a dynamic QR code 14 can be associated with a field device 12 in a dynamic display arrangement, and a static QR code 14 can be associated with a field device 16. A hand held computing device 18 is shown in FIG. 1 on the left hand side and on the right hand side of FIG. 1 with different screens 19, 21 of, for example, an "app" for monitoring and maintaining the field devices 12 and 16. In the dynamic display arrangement, the QR code 14 is displayed graphically via a dynamic display 12 (e.g., an LCD (Liquid Crystal Display).

Note that the term "QR" as utilized herein can refer to a QR code and/or data associated with such a QR code. A QR or QR code is a multi-dimensional code that may be utilized in the context of various forms of communications. For example, a QR code can be used in advertisements to encode a company's web link. A QR code may be a specific multi-dimensional machine readable code that is designed to be read by portable optical type reading mechanisms such as smartphones. The information encoded may be text, a URL, or other data. Other types of multi-dimensional machine readable codes may be utilized in the present embodiments in lieu of or in association with, for example, the disclosed QR codes.

An example multi-dimensional code may be a 2D (two-dimensional) barcode that is a graphical image that stores information both horizontally, as one-dimensional bar codes do, and vertically. One feature may be how the 2D code can be used to encode virtually all required design and functional characteristics of a field device/panel, a mobile device, and so on. The data may be read and consumed directly into the application offline. It does not necessarily require any other machine or server to fetch the data.

The scenarios incorporated herein do not necessarily contain multi-dimensional codes that represent actual end results. For example, a QR code for encrypted information and a QR code for a compressed schematic are not necessarily available. They may be explained in text form to describe the idea, but in reality they can be implemented in binary encoded QR form. There may be various new scenarios for use of a QR code other multi-dimensional codes. Other versions of visual machine readable codes may be read. As an example of a code, the QR code may be used herein for illustrative purposes in the description of the present embodiments.

Figure 2:
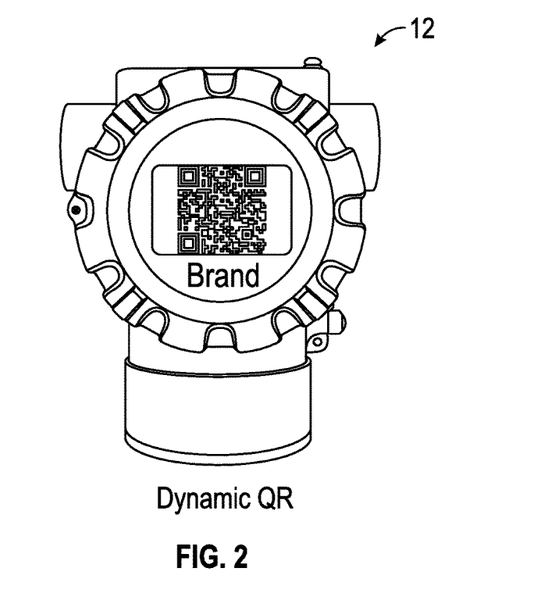
FIG. 2 illustrates a field device having a dynamic display, in accordance with an example embodiment.

FIG. 2 illustrates a field device having a dynamic display 12, in accordance with an example embodiment. The dynamic display 12 can be utilized to render a QR code such as QR code 14 on the display 12 connected to, for example, the field device shown in FIG. 1. Such dynamic displays of QR codes may provide more real-time information regarding the operation of a particular field device. Various device and process parameters can be embedded in the QR code. When scanned and decoded by a handheld device such as the hand held device 19, the parameters are displayed on screen of the handheld.

The QR Code system 10 shown in FIG. 1, for example, can offer fast readability and greater storage capacity than present systems. The system 10 can embed the critical data and information such as a device ID, maintenance/installation and fault data (which directly maps to the location of that particular device ID), and allow operators to scan the code and retrieve the information on a mobile device, and process such data. In a connected environment, the QR code discussed herein can be used to identify the device/equipment and obtain the device information from a hosted environment such as SCADA/HMI/Cloud where this information is available.

SCADA refers to "Supervisory Control and Data Acquisition," which is a type of computer system for gathering and analyzing real time data. SCADA systems can be used, for example, to monitor and control a plant or equipment in industries such as telecommunications, water and waste control, energy, oil and gas refining, and transportation. HMI (Human Machine Interface) refers to a software application that can present information to an operator or user about the state of a process, and to accept and implement the operators control instructions. Typically, information is displayed in a graphic format (Graphical User Interface or GUI). Finally, the term "cloud" refers to "cloud computing," which is a type of Internet-based computing paradigm or arrangement that provides shared computer processing resources and data to computers and other devices on demand.

Figure 3:
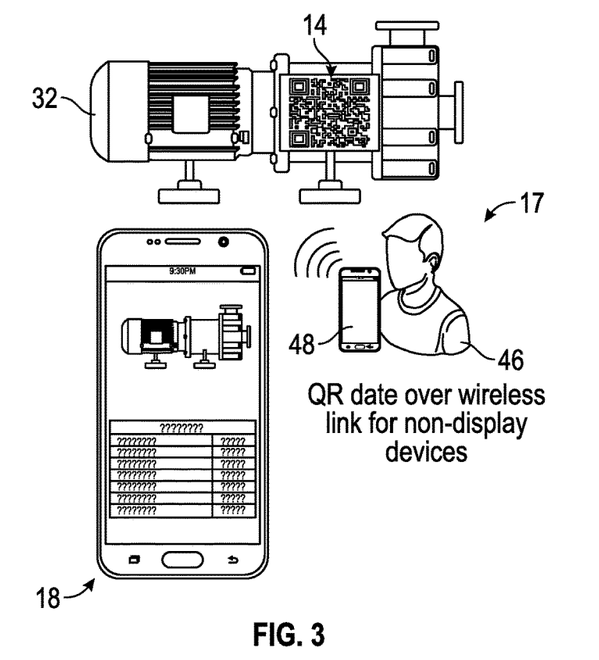
FIG. 3 illustrates a schematic diagram of a system for transferring QR data over a wireless communications link for non-display devices, in accordance with an example embodiment.

FIG. 3 illustrates a schematic diagram of a system 17 for transferring QR data over a wireless communications link for non-display devices, in accordance with an example embodiment. Note that some of the same features shown in FIG. 1 are also depicted in FIG. 3. For example, the hand held device 18 (i.e., which can be a mobile device such as a smartphone, tablet computing device, a wearable computing device, etc.) can retrieve the QR code 14 from a field device 32. An operator or user 46, for example, can utilize his or her hand held device 48 (similar to the device 18) to retrieve the QR data associated with QR code 14 over a wireless link for non-display devices.

Note that in an isolated environment for devices that have a local display, the QR code carrying the required info can be dynamically generated on the display (e.g., display 12 shown in FIGS. 1-2), whenever the operator seeks this information. In the case of unavailability of such a display (e.g., LCD Display), the device can transfer the dynamic QR code using a communication mechanism or link such as BLE, Bluetooth, Wi-Fi, NFC. The application program will read and display the process and device data accordingly. This is the situation shown in the example embodiment of FIG. 3.

In the case of field transmitters, the dynamic QR code can reside in a remote meter connected to the field instrument, such as the field device 32 shown in FIG. 3. The redefined dynamic QR can be stored and retrieved in runtime. In addition, dynamic QR periodicity can be stored in runtime and a dynamic QR can be used to authenticate/authorize a user such as the user 46 shown in FIG. 3. In addition, as will be discussed in greater detail herein, the process parameter under measurement can be enhanced by AR (Augmented Reality) showing the internal physical layout of equipment. An operator such as the user 46 can also ask for a process value and retrieve the information using, for example, Voice API Integration. Such features can be further enhanced by performing contextual analytics, such as determining the health of the overall process equipment, etc.

Note that the term Augmented Reality or AR as utilized herein refers to a live direct or indirect view of a physical, real-world environment whose elements are augmented (or supplemented) by computer-generated sensory input such as sound, video, graphics, or GPS. AR is related to a more general concept referred to as mediated reality, in which a view of reality is modified (possibly even diminished rather than augmented) by a computer. As a result, the technology functions by enhancing one's current perception of reality. Augmentation is conventionally in real time and in semantic context with environmental elements, such as features or scenes from an industrial environment.

Figure 4:
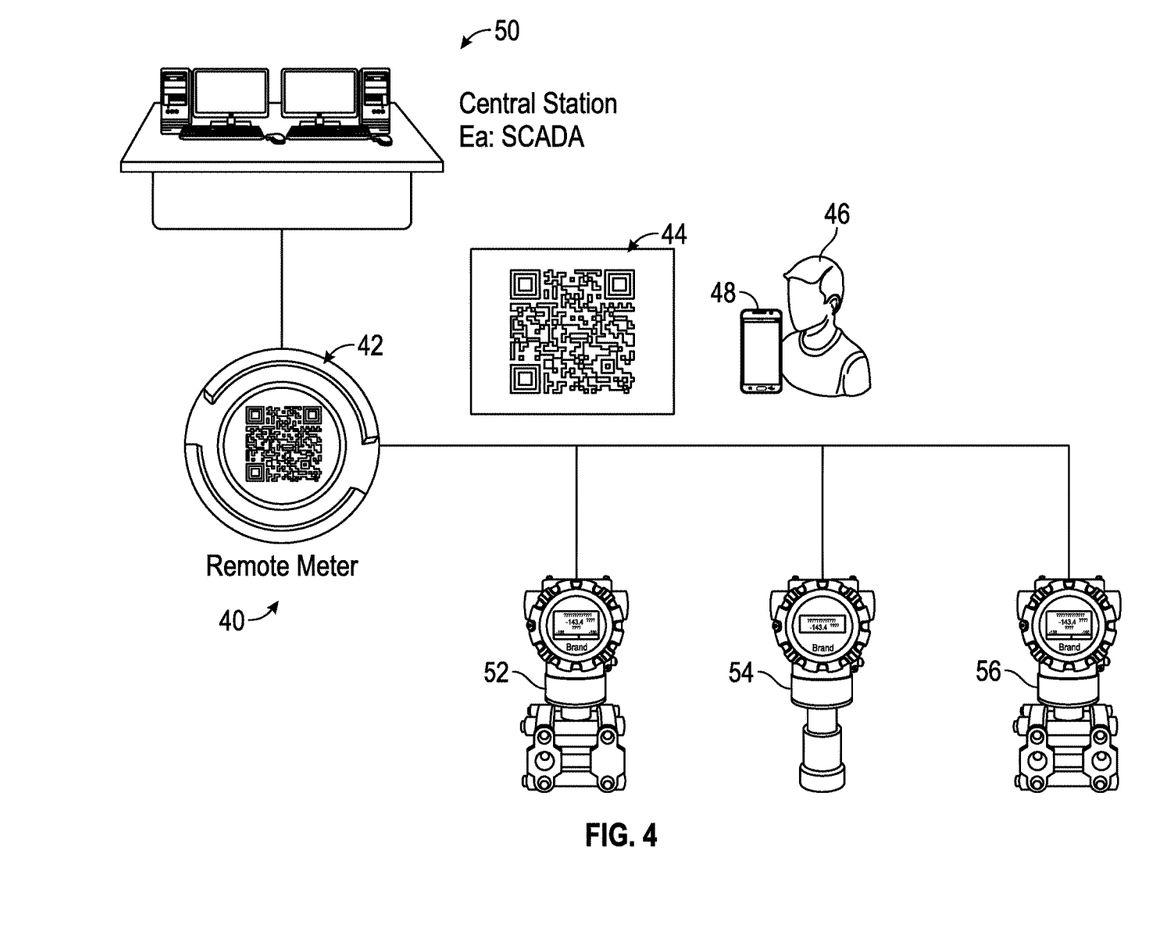
FIG. 4 illustrates a schematic diagram of a system for multi-device monitoring using a dynamic QR code arrangement and/or a remote meter, in accordance with an example embodiment.

FIG. 4 illustrates a schema diagram of a system 40 for multi-device monitoring using a dynamic QR code arrangement and/or a remote meter 42, in accordance with an example embodiment. System 40 incudes a central system 50 (e.g., SCADA system) that communicates with the remote meter 42, which in turn communicates with one or more field devices 52, 54, and 56. The remote meter 42 includes a QR code 44, and each of the field devices 52, 54, and 56 may include their own respective displays (e.g., such as the display 12 discussed earlier).

The remote meter 44 can be configured to log/read data from multiple field devices 52, 54, 56, etc., on a multi-drop line. Note that a multi-drop line is an arrangement in which a number of devices are connected to a single central line. Assuming that the line is a cable connecting all the devices, the capacity of this central cable may be shared between the devices in such an arrangement. In the configuration shown in FIG. 4, the remote meter 42 can display the dynamic code from each field device 52, 54, 56, in a predefined sequence. An operator such as the user 46 can scan the dynamic QR 44 with his or her mobile device 48 to obtain data from the multiple devices 52, 54, 56, etc., connected on the line.

The disclosed embodiments offer a solution, which enables plant personnel to collect data by scanning dynamic QR codes. Such a solution can also embed media enriched location information about a device, any time and on any device. The device data can be populated into a map layer in real time. Captured data can be analyzed, shared, and published based on the requirement. The disclosed approach also renders workflow and decision making effective by creating accurate and timely information in a fast and user-friendly manner. In addition, the disclosed embodiments allow a user to access a form on a device via an "app" and populate the device data immediately by scanning the disclosed dynamic QR.

Figure 5:
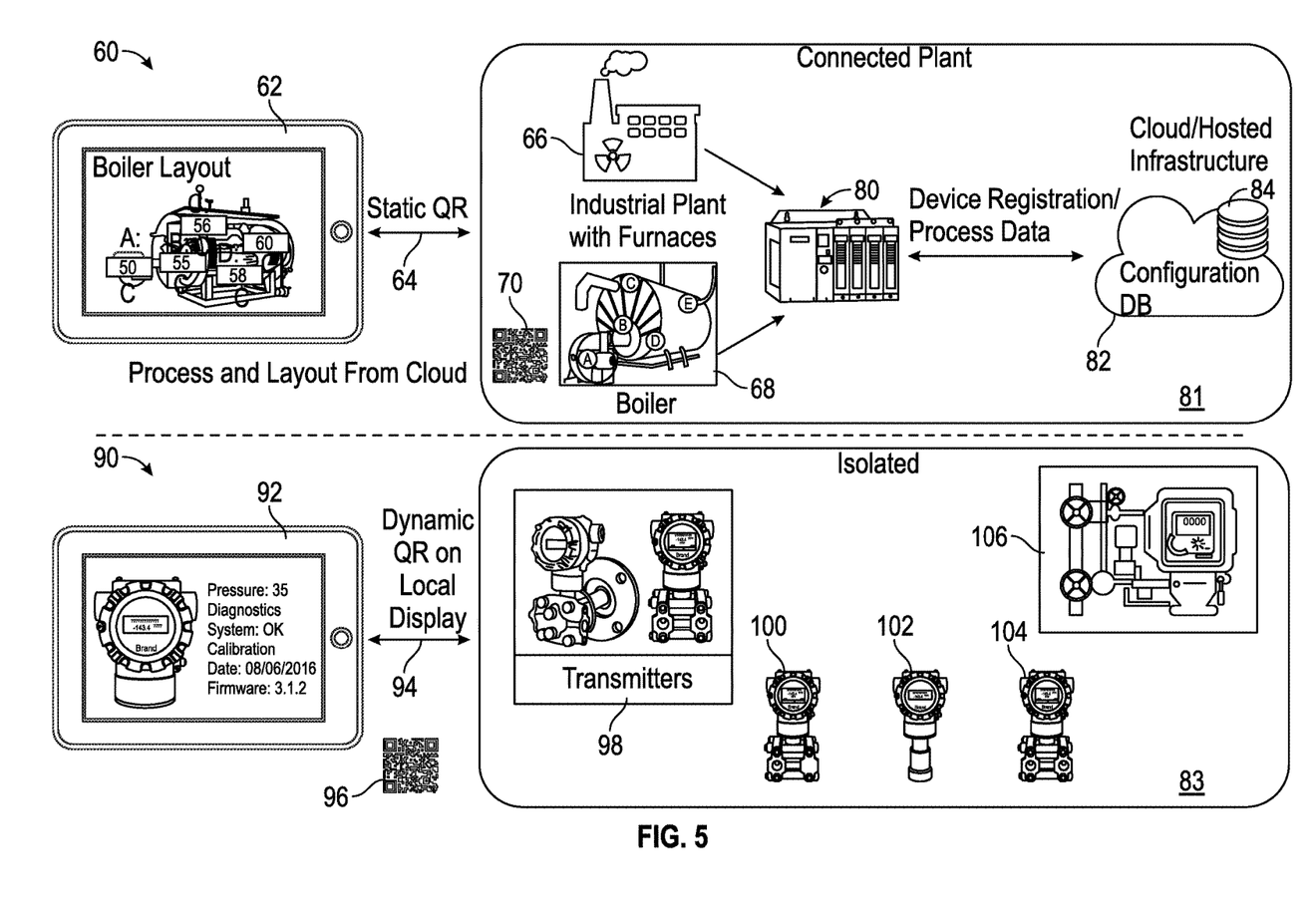
FIG. 5 illustrates a schematic diagram of a QR-AR integration for a connected plant and/or an isolated arrangement, in accordance with an example embodiment.

FIG. 5 illustrates a schematic diagram of a QR-AR integration for a system 60 composed of a connected plant 81 and/or a system 90 that includes an isolated arrangement 83, in accordance with an example embodiment. System 60 includes a mobile device 62 (e.g., a tablet computing device, a smartphone, etc.) that can scan and retrieve a static QR as shown at bidirectional arrow 64 from the connected plan 81. An example of such a QR is the QR 70. The connected plant 81 can include a cloud-hosted infrastructure comprising a configuration database 84 and a cloud computing system 82. This cloud-hosted infrastructure can communicate with a central server 80 that in turn communicates with an industrial plant 66 and its furnaces, etc., and systems and devices such as a boiler 68.

System 90, on the other hand, implements an isolated arrangement 83 composed of one or more field transmitters 98, a remote meter 106, and one or more field devices 100, 102, 104, etc. The bidirectional arrow 94 indicates the retrieval of a dynamic QR such as CR 96 from local displays associated with transmitters 98, field devices, 100, 102, 104 and so on, for display via the graphical user interface of a mobile device 92 as facilitated by an "app".

Note that the "app" can be implemented via mobile devices 62, 92 and can include the use of AR features. That is, a dynamic QR code can be used to access live process value and other device data on a mobile device 62 or 92 as facilitated by such an app, which enables seamless access to device documentation/help data (e.g., URLs, etc.) on the mobile device. Aided with AR, a user can obtain the overall device and process status data along with the internal physical layout of devices in a plant in a fast and user friendly manner.

Figure 6:
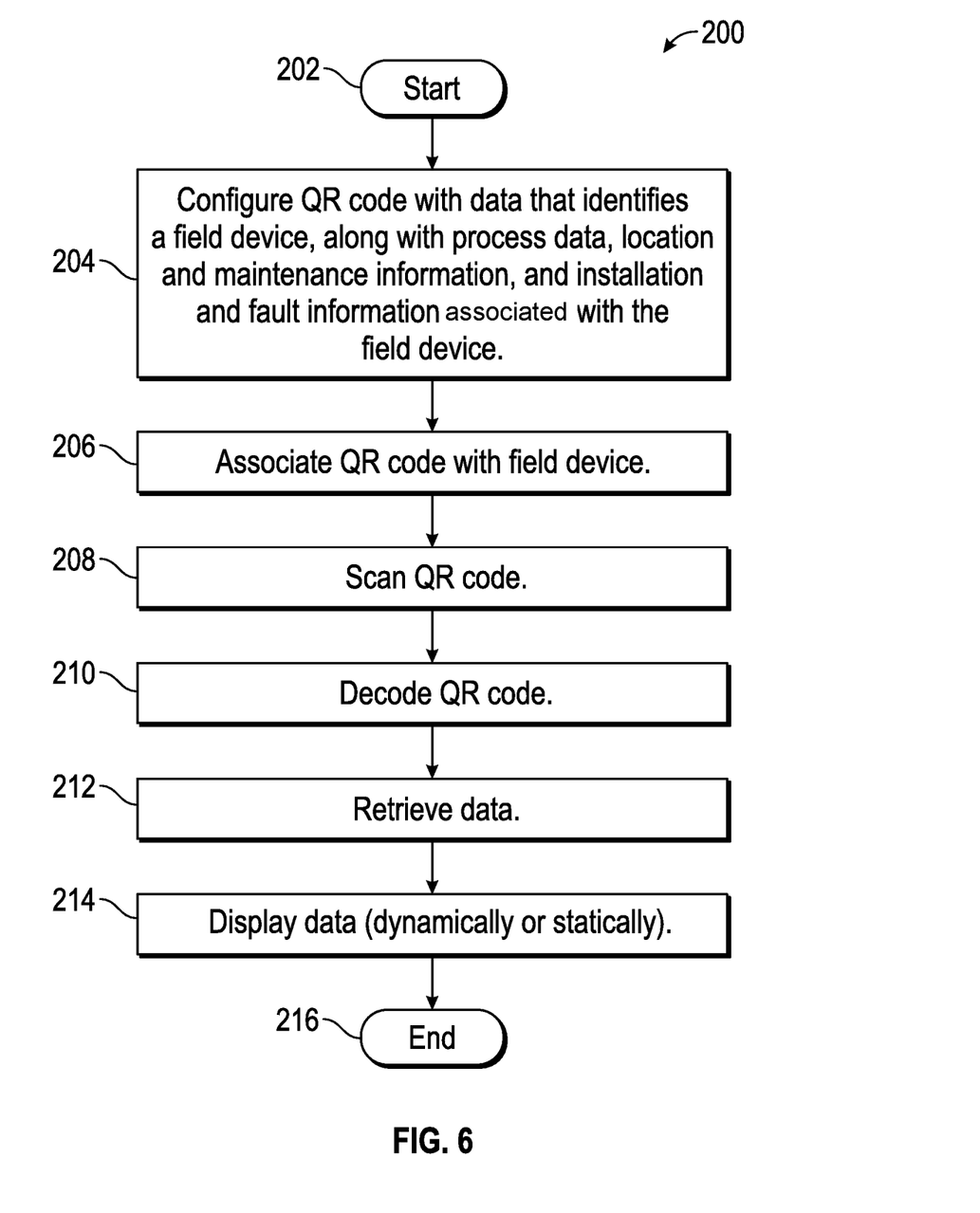
FIG. 6 illustrates a flow chart of operations depicting logical operational steps of a method for monitoring processing equipment in a connected environment, in accordance with an example embodiment.

FIG. 6 illustrates a flow chart of operations depicting logical operational steps of a method 200 for monitoring processing equipment in a connected environment, in accordance with an example embodiment. It can be appreciated that the method 200 shown in FIG. 6 represents one possible embodiment of a method for monitoring process equipment, but that modifications or variations to such a method are possible. Additionally, the particular order of operations or steps shown in FIG. 6 is for exemplary purposes only and that a different order of operations is possible. Thus, the process can be initiated as indicated at block 202. The QR code can be configured, as shown at block 204, to contain data that identifies the field device along with process data regarding the field device, the location of the field device, and maintenance information, installation information and fault information associated with the field device. Next, as shown at block 206, a step or operation can be implemented for associating the QR code with the field device. Then, the QR code can be scanned as indicated at block 208 and decoded, as shown at block 210. Thereafter, the appropriate or necessary data can be retrieved, as shown at block 212, and then displayed dynamically or statically as indicated at block 214. The process can then terminate as shown at block 216.

As can be appreciated by one skilled in the art, some example embodiments can be implemented in the context of a method, data processing system, or computer program product. Accordingly, some example embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network (e.g., Wi-Fi, Wimax, 802.xx, a cellular network, an industrial wireless network, etc.), or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein. Such instructions can, for example, include instructions (i.e., steps or operations) such as those discussed herein with respect to FIGS. 1-5.

Note that a processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general-purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two, or more processors of the same or different types. It is noted that a computer, computing device and user device, and the like, may refer to devices that include a processor, or may be equivalent to the processor itself.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
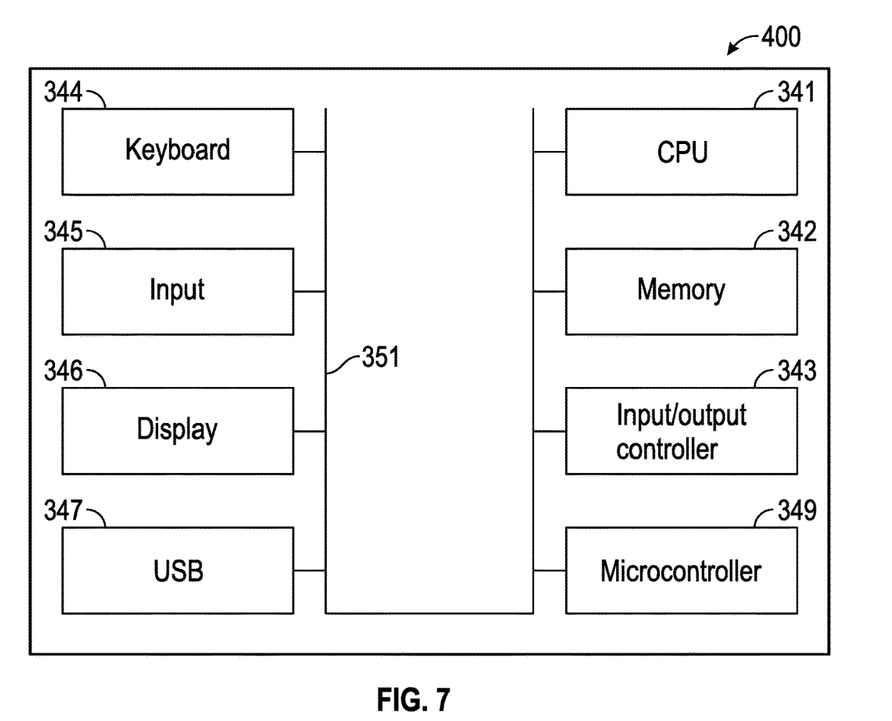
FIG. 7 illustrates a schematic view of a computer system/apparatus, in accordance with an embodiment.
Figure 8:
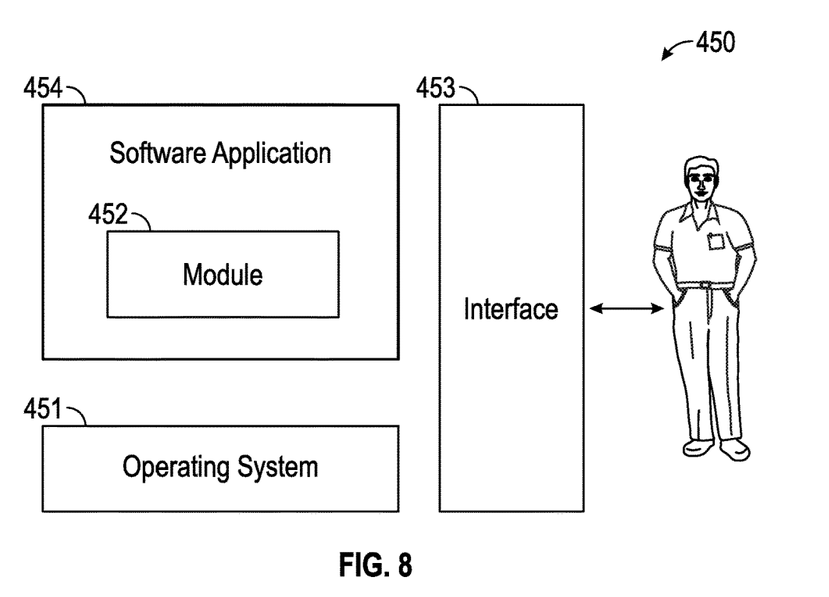
FIG. 8 illustrates a schematic view of a software system including a module, an operating system, and a user interface, in accordance with an embodiment.

FIGS. 7-8 are shown only as exemplary diagrams of data-processing environments in which example embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 349 (which may be optional), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server).

In some example embodiments, data-processing system/apparatus 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi, etc.).

FIG. 8 illustrates a computer software system/apparatus 450 for directing the operation of the data-processing system/apparatus 400 depicted in FIG. 7. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user may supply additional inputs or terminate a session. The software application 454 can include module(s) 452, which can, for example, implement the various instructions or operations such as those discussed herein with respect to FIGS. 1-5 herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In other embodiments, a module may refer to a hardware component or a combination of hardware and software.

FIGS. 7-8 are thus intended as examples and not as architectural limitations of the disclosed embodiments. Additionally, such example embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms such as, but not limited to, Macintosh, UNIX, LINUX, and so on.

A number of advantages can result from the disclosed embodiments. For example, the disclosed approach can quickly capture data in the field but with a unique and secured device access, while enhancing the operational effectiveness for customers and other users. This approach also will result in better visibility of process and device status for monitoring and maintenance purposes, while also eliminating the need for operational specific hand held devices for monitoring.

The disclosed approach also offers the ability to share data collected as services and also transforms the user experience with ease of access (e.g., avoiding physically connected the hand held device on the loop line to read device data), a reduction in the tedious task of displaying menu navigation to read multiple parameters, and saving time in data collection from a field device. This approach can also extend the application-to-legacy install based in a connected environment such as a connected plant, where many devices do not offer a local display. Note that in the case of the unavailability of a display such as, for example, a LCD Display, the disclosed device/system can transfer the dynamic QR code using a communications mechanism such as, for example, Bluetooth, BLE, Wi-Fi, or NFC. An application program can read and display the process and device data accordingly.

This approach can further improve overall field maintenance time with much better and accurate information. Device data can also be embedded with geolocation and clubbed with field data.

Based on the foregoing, it can be appreciated that a number of example embodiments are disclosed herein. For example, in one embodiment a method can be implemented for monitoring process equipment. Such a method can includes steps or operations such as, for example, associating a QR code with a field device, wherein the QR code contains data that identifies the field device, contains process data regarding the field device, a location of the field device, and maintenance information, installation information and fault information associated with the field device; and scanning and decoding the QR code in order to retrieve the data.

In some example embodiments, a step or operation can be implemented for retrieving the data in response to the scanning and the decoding of the QR code. In another example embodiment, a step or operation can be provided for displaying the data in a display area of a mobile device in response to the scanning and the decoding of the QR code.

In yet another example embodiment, a step or operation can be implemented for dynamically displaying the QR code within a dynamic display that is associated with the field device. In still another example embodiment, the QR code can be dynamically generated and displayed via the dynamic display in response to a user input. In another example embodiment, a step or operation can be provided for statically displaying the QR code on and in association with the field device.

In another example embodiment, a system can be implemented for monitoring process equipment. Such a system can include a field device associated with a QR code. In such a system, the QR code contains data that identifies the field device, contains process data regarding the field device, a location of the field device, and maintenance information, installation information and fault information associated with the field device. The QR code can be scanned and decoded in order to retrieve the data.

In yet another example embodiment, a system for monitoring process equipment can be implemented that includes, for example, at least one processor; and a non-transitory computer-usable medium embodying computer program code, the computer-usable medium capable of communicating with the at least one processor. The computer program code can include instructions executable by the at least one processor and configured for: associating a QR code with a field device, wherein the QR code contains data that identifies the field device, contains process data regarding the field device, a location of the field device, and maintenance information, installation information and fault information associated with the field device; and scanning and decoding the QR code in order to retrieve the data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure and all such modifications are intended to be included within the scope of the disclosure.

The invention claimed is:

1. A method for monitoring process equipment, said method comprising:
    associating a QR code with a field device comprising process control equipment of an industrial control system in a connected plant, wherein said QR code contains data that identifies said field device, contains process data regarding said field device, a location of said field device, and maintenance information, installation information and fault information associated with said field device, said field device comprises a field device selected from a group of field devices comprising at least one of a valve, a furnace, a boiler and a field transmitter in said industrial control system in said connected plant; and
    scanning and decoding said QR code in order to retrieve said data.

2. The method of claim 1 further comprising retrieving said data in response to said scanning and said decoding of said QR code.

3. The method of claim 1 further comprising displaying said data in a display area of a mobile device in response to said scanning and said decoding of said QR code.

4. The method of claim 1 further comprising dynamically displaying said QR code within a dynamic display that is associated with said field device.

5. The method of claim 4 wherein said QR code is dynamically generated and displayed via said dynamic display in response to a user input.

6. The method of claim 1 further comprising statically displaying said QR code on and in association with said field device and wherein said field device comprises at least one of a valve, a furnace, a boiler and a field transmitter in said industrial control system in said connected plant.

7. The method of claim 1 further comprising:
    retrieving said data in response to said scanning and said decoding of said QR code; and
    displaying said data in a display area of a mobile device in response to said scanning and said decoding of said QR code.

8. A system for monitoring process equipment, said system comprising:
    a field device associated with a QR code, wherein said QR code contains data that identifies said field device comprising process control equipment of an industrial control system in a connected plant, contains process data regarding said field device, a location of said field device, and maintenance information, installation information and fault information associated with said field device, said field device comprises a field device selected from a group of field devices comprising at least one of a valve, a furnace, a boiler and a field transmitter in said industrial control system in said connected plant; and
    wherein said QR code is scanned and decoded in order to retrieve said data.

9. The system of claim 8 wherein said data is retrieved in response to scanning and decoding of said QR code.

10. The system of claim 8 wherein said data is displayed in a display area of a mobile device in response to said scanning and said decoding of said QR code.

11. The system of claim 8 wherein said QR code is dynamically displayed within a dynamic display that is associated with said field device.

12. The system of claim 11 wherein said QR code is dynamically generated and displayed via said dynamic display in response to a user input.

13. The system of claim 8 wherein said QR code is statically displayed on and in association with said field device and wherein said field device comprises at least one of a valve, a furnace, a boiler and a field transmitter in said industrial control system in said connected plant.

14. A system for monitoring process equipment, said system comprising:
    at least one processor; and
    a non-transitory computer-usable medium embodying computer program code, said computer-usable medium capable of communicating with said at least one processor, said computer program code comprising instructions executable by said at least one processor and configured for:
        associating a QR code with a field device comprising process control equipment of an industrial control system in a connected plant, wherein said QR code contains data that identifies said field device, contains process data regarding said field device, a location of said field device, and maintenance information, installation information and fault information associated with said field device said field device comprises a field device selected from a group of field devices comprising at least one of a valve, a furnace, a boiler and a field transmitter in said industrial control system in said connected plant; and
        scanning and decoding said QR code in order to retrieve said data.

15. The system of claim 14 wherein said instructions are further configured for retrieving said data in response to said scanning and said decoding of said QR code.

16. The system of claim 14 wherein said instructions are further configured for displaying said data in a display area of a mobile device in response to said scanning and said decoding of said QR code.

17. The system of claim 14 wherein said instructions are further configured for dynamically displaying said QR code within a dynamic display that is associated with said field device.

18. The system of claim 17 wherein said QR code is dynamically generated and displayed via said dynamic display in response to a user input.

19. The system of claim 14 wherein said instructions are further configured for statically displaying said QR code on and in association with said field device and wherein said field device comprises at least one of a valve, a remote meter, a furnace, a boiler and a field transmitter in said industrial control system in said connected plant.

20. The system of claim 14 wherein said instructions are further configured for:

retrieving said data in response to said scanning and said decoding of said QR code; and displaying said data in a display area of a mobile device in response to said scanning and said decoding of said QR code.

\* \* \* \* \*